United States Patent [19]

Isono et al.

[11] 4,444,506

[45] Apr. 24, 1984

[54] METHOD AND APPARATUS FOR CORRECTING THE RECIPROCITY LAW FAILURE OF A PHOTOSENSITIVE MATERIAL

[75] Inventors: Koichi Isono, Hikone; Tsuneo Takagi, Kurita, both of Japan

[73] Assignee: Dainippon Screen Seizo Kabushiki Kaisha, Kyoto, Japan

[21] Appl. No.: 295,263

[22] Filed: Aug. 24, 1981

[30] Foreign Application Priority Data

Sep. 22, 1980 [JP] Japan ................................. 55-130789

[51] Int. Cl.³ .......................... G01J 3/50; G03B 27/78
[52] U.S. Cl. ......................................... 356/404; 355/38
[58] Field of Search ....... 356/404, 443, 444, 405 (U.S. only),
356/406 (U.S. only); 355/35, 37, 38; 364/525

[56] References Cited

U.S. PATENT DOCUMENTS

| | | | |
|---|---|---|---|
| 3,178,999 | 11/1961 | Clapp | 355/38 |
| 4,194,838 | 3/1980 | Bey et al. | 356/443 |
| 4,222,661 | 9/1980 | Wahi et al. | 355/38 |

*Primary Examiner*—Vincent P. McGraw
*Assistant Examiner*—L. A. Dietert
*Attorney, Agent, or Firm*—Daniel M. Rosen

[57] ABSTRACT

A method and apparatus for correcting the reciprocity law failure of a photosensitive material to be exposed, for use in a picture reproducing machine such as a process camera are disclosed. Luminous energies of an original picture and a standard picture are detected by a light detector, and then the exposure luminous energy is compared with the standard luminous energy by an arithmetic unit. Then, an exposure time is calculated in a calculator by using the comparison result and fundamental data such as the standard luminous energy, a standard exposure time predetermined, and a correction factor predetermined, which are recorded in data setup means.

4 Claims, 3 Drawing Figures

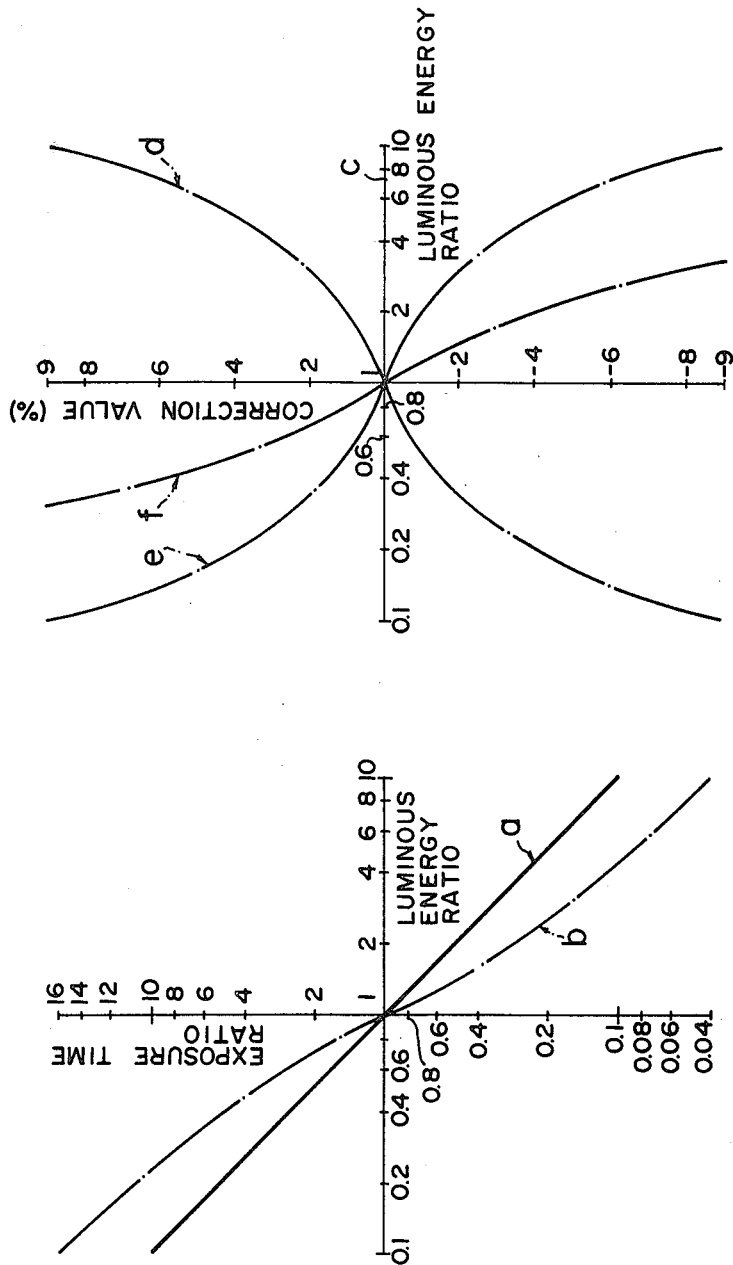

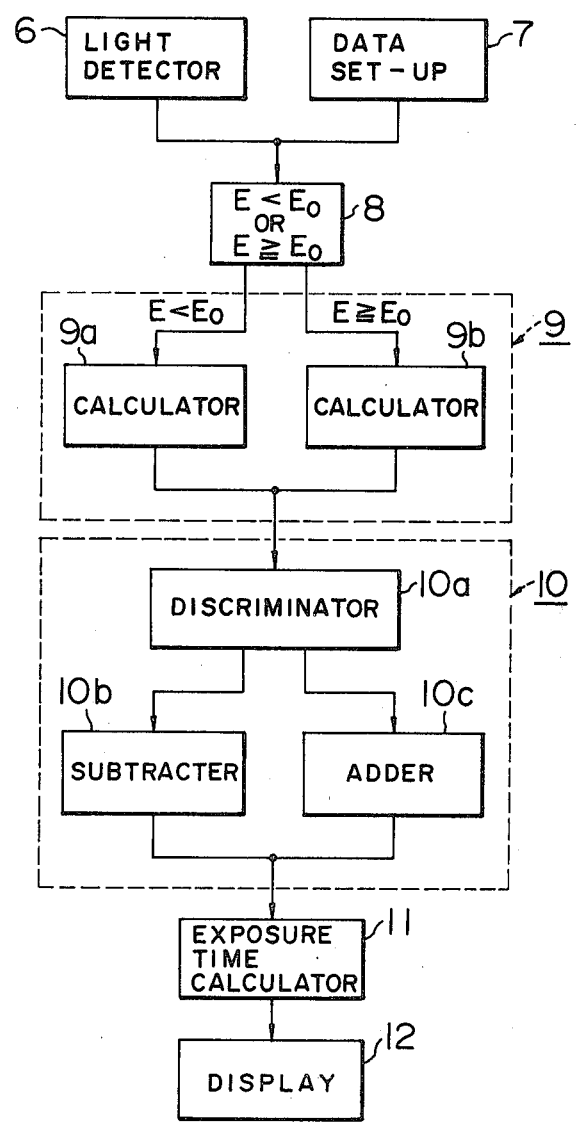

METHOD AND APPARATUS FOR CORRECTING THE RECIPROCITY LAW FAILURE OF A PHOTOSENSITIVE MATERIAL

BACKGROUND OF THE INVENTION

This invention relates to a method and apparatus for correcting the reciprocity law failure of a photosensitive material, for use in a picture reproducing machine such as a process camera, and the like.

As is well-known, a sensitivity of a color photosensitive material is depressed due to its reciprocity law failure when the illuminance is low. Hence, in order to perform a proper exposure, the exposure time should be corrected. Further, the reciprocity law failures of the three color layers of the photosensitive material are varied depending on the luminous energy, and accordingly the color balance is deteriorated. Therefore, for example, the exposure time for a cyan filter is reduced and the exposure time for a yellow filter is increased.

Meanwhile, even when the exposure is properly performed depending on the average luminous energy by using an ideal photosensitive material whose reciprocity law holds good, or the above described correction of the reciprocity law failure is carried out during the exposure which is performed depending on the average luminous energy by using a usual photosensitive material, a density failure and a color failure occur as follows.

That is, when the dark background of the picture is large, the essential part having a small light area is exposed excessively, and, on the other hand, when the light background is large, the essential part having a small dark area is exposed insufficiently. When the red, green or yellow background of the picture is large, the red, green or yellow color is emphasized in a small essential part.

Heretofore, various methods for correcting such density and color failures have been developed. However, the corrections of the reciprocity law failures against the luminous energy and the color layers of the photosensitive material have been carried out depending on the experiences of a skilled person.

SUMMARY OF THE INVENTION

It is an object of the present invention to provide a method for correcting the reciprocity law failure of a photosensitive material, for use in a picture reproducing machine, free from the aforementioned defects, which is simple, stable and reliable and which is capable of performing a quick operation without any skill.

It is another object of the present invention to provide an apparatus for correcting the reciprocity law failure of a photosensitive material, for use in a picture reproducing machine, free from the aforementioned defects, which is simple, stable and reliable and which is capable of performing a quick operation without any skill.

According to the present invention there is provided a method for correcting the reciprocity law failure of a photosensitive material to be exposed, for use in a picture reproducing machine, comprising the steps of (a) detecting a luminous energy of an original picture, (b) comparing the luminous energy detected with a standard luminous energy predetermined, and (c) obtaining an exposure time by using the comparison result, a standard exposure time predetermined, and a correction factor predetermined for the reciprocity law failure of the photosensitive material.

According to the present invention there is also provided an apparatus for correcting the reciprocity law failure of a photosensitive material to be exposed, for use in a picture reproducing machine, comprising (a) a light detector which detects luminous energies of an original picture to be reproduced and a standard picture to obtain an exposure luminous energy and a standard luminous energy, (b) data setup means which records the standard luminous energy, a standard exposure time predetermined, and a correction factor predetermined for the reciprocity law failure of the photosensitive material, (c) an arithmetic unit which compares the exposure luminous energy with the standard luminous energy, and calculates the first exposure time by using the comparison result and the data recorded in the data setup means, and (d) a calculator which calculates the second exposure time for each color from the first exposure time.

BRIEF DESCRIPTION OF DRAWINGS

In order that the present invention may be better understood, preferred embodiments thereof will be described with reference to the accompanying drawings, in which:

FIG. 1 is a graph showing a reciprocity law failure of a color photosensitive material;

FIG. 2 is a graph showing reciprocity law failures of color layers of a color photosensitive material; and FIG. 3 is a block diagram of an apparatus which performs a method according to the present invention.

DESCRIPTION OF PREFERRED EMBODIMENTS

Generally, when the reciprocity law of a photosensitive material holds good, the following equation is satisfied, wherein $E_0$ means a standard luminous energy, $T_0$ means a standard exposure time, $E$ means an exposure luminous energy for a correct exposure, and $T$ means an exposure time.

$$(T/T_0) = (E_0/E) \tag{1}$$

However, in practice, this equation (1) is not satisfied by reason of the reciprocity law failure of the photosensitive material, and the following empirical equations wherein $\alpha$ means a correction factor, are obtained on the basis of experiences.

$$\text{When } E < E_0; \; \frac{T}{T_0} = \frac{E_0}{E}(1 + \alpha) - \alpha \tag{2}$$

$$\text{When } E \geq E_0; \; \frac{T}{T_0} = \frac{E_0}{E(1 + \alpha) - E_0\alpha} \tag{3}$$

In FIG. 1, there is shown a characteristics curve (b) of the reciprocity law failure of a photosensitive material, which satisfies the equations (2) and (3). A line (a) represents characteristics of a photosensitive material when $\alpha$ is zero, viz., the reciprocity law holds good. The curve (b) well represents characteristics of the reciprocity law failure of an available photosensitive material when $\alpha$ is 1.6.

Then, a correction amount or value F of the reciprocity law failure, when the photosensitive material is exposed under the luminous energy E by using a cyan, magenta or yellow filter, hereinafter referred to as a C, M or Y filter, is calculated by the following empirical equations wherein $\beta$ means a correction factor, which is obtained on the basis of the experiences.

$$\text{When } E < E_0 \cdot F = \left(\frac{E_0}{E} - 1\right) \beta \quad (4)$$

$$\text{When } E \geq E_0 \cdot F = \left(\frac{E}{E_0} - 1\right) \beta \quad (5)$$

In these equations, the correction factor $\beta$ is determined in the followings.

For the C filter:
  When $E < E_0$; $\beta = -1$
  When $E \geq E_0$; $\beta = 1$
For the M filter:
  When $E < E_0$; $\beta = 1$
  When $E \geq E_0$; $\beta = -1$
For the Y filter:
  When $E < E_0$; $\beta = 4$
  When $E \geq E_0$; $\beta = -4$ In FIG. 2 there are shown correction value curves (d), (e) and (f) for correcting the reciprocity law failures of the C, the M and the Y filters used during the exposure of the photosensitive material, which satisfy the equations (4) and (5). A curve (c) represents characteristics of a photosensitive material when $\beta$ equals zero, i.e. the reciprocity law holds good. The curves (d), (e) and (f) well represent characteristics of color layers of an available photosensitive material. The curves (d), (e) and (f) show that it is necessary to reduce the exposure time for the C filter and to increase the exposure times for the M and the Y filters when the standard luminous energy $E_0$ is more than the exposure luminous energy E, and that it is necessary to increase the exposure time for the C filter and to reduce the exposure times for the M and the Y filters when the standard luminous energy $E_0$ is at least the exposure luminous energy E.

In practice, in order to correct the reciprocity law failure, it is possible to increase the exposure times for the M and the Y filters instead of the reduction of the exposure time for the C filter when the standard luminous energy $E_0$ is more than the exposure luminous energy E, and to increase the exposure times for the C and the M filters instead of the reduction of the exposure time for the Y filter when the standard luminous energy $E_0$ is at least the exposure luminous energy E, depending on the fact that the correction value for the Y filter is lesser than that for the M filter, as shown in FIG. 2.

In FIG. 3 there is shown a block diagram of an apparatus of the present invention which performs a method for correcting the reciprocity law failure of a photosensitive material according to the present invention.

A light detector 6 comprising a photo sensor is positioned in the front or the rear of a photographing lens of a copying apparatus, and detects average luminous energies $E_0$ and E of a standard picture and an original picture to be reproduced prior to the exposure operation.

A data setup means 7 inputs fundamental data such as the standard luminous energy $E_0$, the standard exposure time $T_0$, the correction factor $\alpha$ of the reciprocity law failure for the luminous energy, the correction factors $\beta_C$, $\beta_M$ and $\beta_Y$ for correcting the reciprocity law failures for the C, the M and the Y filters, a density failure correction factor Q, if necessary, color failure correction factors $R_C$, $R_M$ and $R_Y$, if necessary, by operating switches arranged on an operational board.

A discriminator means 8 receives the output signals from the light detector 6 and the data setup means 7, and determines which is larger, the standard luminous energy $E_0$ or the exposure luminous energy E, i.e. $E < E_0$ or $E \geq E_0$.

An arithmetic means 9 for correcting the reciprocity law failure comprises a pair of calculators 9a and 9b, and calculates the exposure time T for which the reciprocity law failure of the luminous energy is corrected, and the correction values $F_C$, $F_M$ and $F_Y$ for which the reciprocity law failure of cyan, magenta and yellow colors are corrected, from the average luminous energy E and the fundamental data such as the standard exposure time $T_0$, the standard luminous energy $E_0$, the correction factors $\alpha$, $\beta_C$, $\beta_M$ and $\beta_Y$, and the like, as follows. That is, when the descriminator means 8 descriminates $E < E_0$ or $E \geq E_0$, the calculator 9a or 9b calculates the exposure time T and the correction values $F_C$, $F_M$ and $F_Y$ according to the equations (2) and (4), or (3) and (5).

Then, the density failure and the color failure are corrected by using the density failure correction factor Q and the color failure correction factors $R_C$, $R_M$ and $R_Y$, as occasion demands.

An arithmetic means 10 for selecting filters and adjusting the correction values comprises a discriminator 10a, a subtractor 10b and an adder 10c. The discriminator 10a determines the correction values $F_C$, $F_M$ and $F_Y$ calculated in the arithmetic means 9, and then, when these values are all positive, a certain number is subtracted from every correction value in the subtractor 10b so that one of the correction values may become zero, or when at least one of the correction values $F_C$, $F_M$ and $F_Y$ is negative, a certain number is added to every correction value in the adder 10c so that the minimum value may become zero.

For example, when the correction values $F_C$, $F_M$ and $F_Y$ are $-6\%$, $6\%$ and $24\%$, respectively, $6\%$ is added to every correction values to obtain $F_C = 0\%$, $F_M = 12\%$ and $F_Y = 30\%$.

An exposure time calculator 11 receives the output signals from the arithmetic means 10 and calculates the exposure times for each color as follows. Assuming that the larger correction value such as $F_Y = 30\%$, and the smaller correction value such as $F_M = 12\%$, except zero such as $F_C = 0\%$, obtained in the arithmetic means 10, are $F_1$ and $F_2$, a white light exposure time Tw when the photosensitive material is exposed by the white light, an independently use exposure time $T_1$ when the photosensitive material is exposed by using the color filter for the larger correction value $F_1$, and a jointly use exposure time $T_2$ when the photosensitive material is exposed by using the color filters for the correction values $F_1$ and $F_2$, are calculated by the following equations, wherein $C_1$ and $C_2$ mean exposure factors for the two filters.

$$Tw = \frac{T \cdot (100 - F_1)}{100}$$

$$T_1 = \frac{T \cdot (F_1 - F_2)}{C_1 \cdot 100}$$

$$T_2 = \frac{T \cdot F_2}{C_1 \cdot C_2 \cdot 100}$$

Therefore, the total exposure time is the sum of $T_w$, $T_1$ and $T_2$, and then, if necessary, the correction of the density failure and the color failure are carried out.

A display 12 receives the exposure times $T_w$, $T_1$ and $T_2$ calculated in the calculator 11 and displays them. The numbers of the exposure times $T_w$, $T_1$ and $T_2$ displayed on the display 12 are started to be subtracted when the exposure is started, and then they become zero when the exposure is finished.

Although the present invention has been described with reference to preferred embodiments thereof, however, various changes and modifications can be made by those skilled in the art without departing from the scope of the present invention.

What is claimed is:

1. A method for correcting the reciprocity law failure of a photosensitive material to be exposed, for use in a picture reproducing machine, comprising the steps of:
    (a) detecting a luminous energy of an original picture;
    (b) comparing the detected luminous energy with a predetermined standard luminous energy;
    (c) obtaining an exposure time by using the comparison result and a predetermined standard exposure time; and
    (d) obtaining a predetermined correction factor for reciprocity law failure of the photosensitive material, the luminous energy and each of the colors.

2. An apparatus for correcting the reciprocity law failure of a photosensitive material to be exposed, for use in a picture reproducing machine, comprising:
    (a) a light detector for detecting luminous energies of an original picture to be reproduced and a standard picture, to obtain an exposure luminous energy and a standard luminous energy respectively;
    (b) data setup means for recording the standard luminous energy, a predetermined standard exposure time, and a predetermined correction factor for the reciprocity law failure of the photosensitive material, said data setup means recording correction factors for the reciprocity law failures of the luminous energy and each color;
    (c) an arithmetic unit for comparing the exposure luminous energy with the standard luminous energy, and calculating a first exposure time by using the comparison result and the data recorded in the data setup means, and wherein the arithmetic unit further calculates a correction value for the reciprocity law failure of each color; and
    (d) a calculator for calculating a second exposure time for each color from the first exposure time.

3. An apparatus as defined in claim 2, further comprising a discriminator for determining which is larger, the exposure luminous energy or the standard luminous energy, said arithmetic unit being corrected to perform the calculation depending on the output of the discriminator result.

4. An apparatus as defined in claim 2, further comprising an arithmetic means connected to add or subtract a determined number to or from every correction value so that one of the correction values may be zero.

* * * * *